(12) United States Patent
Girish et al.

(10) Patent No.: US 12,505,421 B2
(45) Date of Patent: Dec. 23, 2025

(54) KEY-PAD CENTRIC PAYMENTS

(71) Applicant: Visa International Service Association, San Francisco, CA (US)

(72) Inventors: Aparna Krishnan Girish, Foster City, CA (US); Barbara Elizabeth Patterson, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/350,431

(22) Filed: Jul. 11, 2023

(65) Prior Publication Data

US 2023/0351361 A1 Nov. 2, 2023

Related U.S. Application Data

(63) Continuation of application No. 17/411,839, filed on Aug. 25, 2021, now Pat. No. 11,741,453, which is a continuation of application No. 16/970,593, filed as application No. PCT/US2018/018817 on Feb. 20, 2018, now Pat. No. 11,144,906.

(51) Int. Cl.
| | |
|---|---|
| G06Q 20/32 | (2012.01) |
| G06F 40/174 | (2020.01) |
| G06Q 20/22 | (2012.01) |
| G06Q 20/34 | (2012.01) |
| G06Q 20/40 | (2012.01) |
| G10L 15/26 | (2006.01) |
| G06F 8/38 | (2018.01) |

(52) U.S. Cl.
CPC ....... *G06Q 20/3223* (2013.01); *G06F 40/174* (2020.01); *G06Q 20/227* (2013.01); *G06Q 20/40145* (2013.01); *G10L 15/26* (2013.01); *G06F 8/38* (2013.01); *G06Q 20/326* (2020.05)

(58) Field of Classification Search
None
See application file for complete search history.

(56) References Cited

U.S. PATENT DOCUMENTS

| | | | |
|---|---|---|---|
| 6,212,638 B1 | 4/2001 | Lee et al. | |
| 10,878,408 B1 * | 12/2020 | Kurani | G06Q 20/3674 |
| 11,144,906 B2 | 10/2021 | Girish et al. | |
| 2006/0064302 A1 | 3/2006 | Ativanichayaphong et al. | |
| 2012/0136756 A1 | 5/2012 | Jitkoff et al. | |
| 2014/0037220 A1 | 2/2014 | Phillips et al. | |
| 2014/0279418 A1 * | 9/2014 | Rubinstein | G06F 15/16 |
| | | | 715/753 |
| 2014/0337774 A1 * | 11/2014 | Baarz | G06F 3/0486 |
| | | | 715/769 |

(Continued)

OTHER PUBLICATIONS

Notice of Allowance dated Jul. 21, 2021 for U.S. Appl. No. 16/970,593 (pp. 1-11).

(Continued)

*Primary Examiner* — Joseph W. King
(74) *Attorney, Agent, or Firm* — K&L Gates LLP

(57) ABSTRACT

Symbols are used to represent payment accounts. The symbols may be programmed to represent accounts and the data for the accounts may be entered into appropriate fields when the symbol is selected. Once selected, account data is retrieved and is communicated to the proper field in the data entry screen. The account data is then used to complete the transaction.

13 Claims, 12 Drawing Sheets

(56) References Cited

U.S. PATENT DOCUMENTS

| | | |
|---|---|---|
| 2015/0039989 A1 | 2/2015 | Dhanawat et al. |
| 2015/0149308 A1 | 5/2015 | Lin |
| 2015/0213442 A1* | 7/2015 | Gottlieb ............. G06Q 30/0226 |
| | | 705/14.27 |
| 2015/0254649 A1 | 9/2015 | Radu |
| 2016/0063478 A1 | 3/2016 | Koeppel et al. |
| 2016/0247144 A1 | 8/2016 | Oh et al. |
| 2018/0004930 A1 | 1/2018 | Csinger et al. |
| 2018/0095653 A1* | 4/2018 | Hasek ................. G06F 3/04883 |
| 2021/0117956 A1 | 4/2021 | Girish et al. |

OTHER PUBLICATIONS

PCT International Search Report and Written Opinion for PCT/US2018/18817, dated May 3, 2018, 15 pages.

\* cited by examiner

KEY-PAD CENTRIC PAYMENTS

CROSS-REFERENCE TO RELATED APPLICATION

This application is a continuation application claiming priority under 35 U.S.C. § 120 to U.S. patent application Ser. No. 17/411,839, filed Aug. 25, 2021, entitled KEY-PAD CENTRIC PAYMENTS, which is a continuation of application Ser. No. 16/970,593 filed on Aug. 17, 2020, which is a national stage entry under 35 U.S.C. § 371 of International Patent Application No. PCT/US2018/018817, filed on Feb. 20, 2018, entitled KEY-PAD CENTRIC PAYMENTS, the entire contents of which are incorporated herein by reference.

BACKGROUND

In the past, payments required exchanging currency. Modern times have brought in electronic payments which use cards to represent accounts which may be accessed electronically. Further, payments have become part of applications on computing devices where account numbers may be manually typed in. However, users have become more accustomed to typing less and less. Emoji and abbreviations have become more and more common in communication. However, payments still require the laborious entry of numbers and letters to execute a transaction.

SUMMARY

Symbols are used to represent payment accounts. The symbols may be programmed to represent accounts and the data for the accounts may be entered into appropriate fields when the symbol is selected. In some embodiments, the symbol may be selected using a sound or a voice. In other embodiments, the symbols may be selected by touching a symbol on a touch screen. In yet another embodiment, a pointer like a joystick is used to select a symbol. Once selected, account data is retrieved and is communicated to the proper field in the data entry screen. The account data is then used to complete the transaction.

SPECIFICATION

Figure 1:
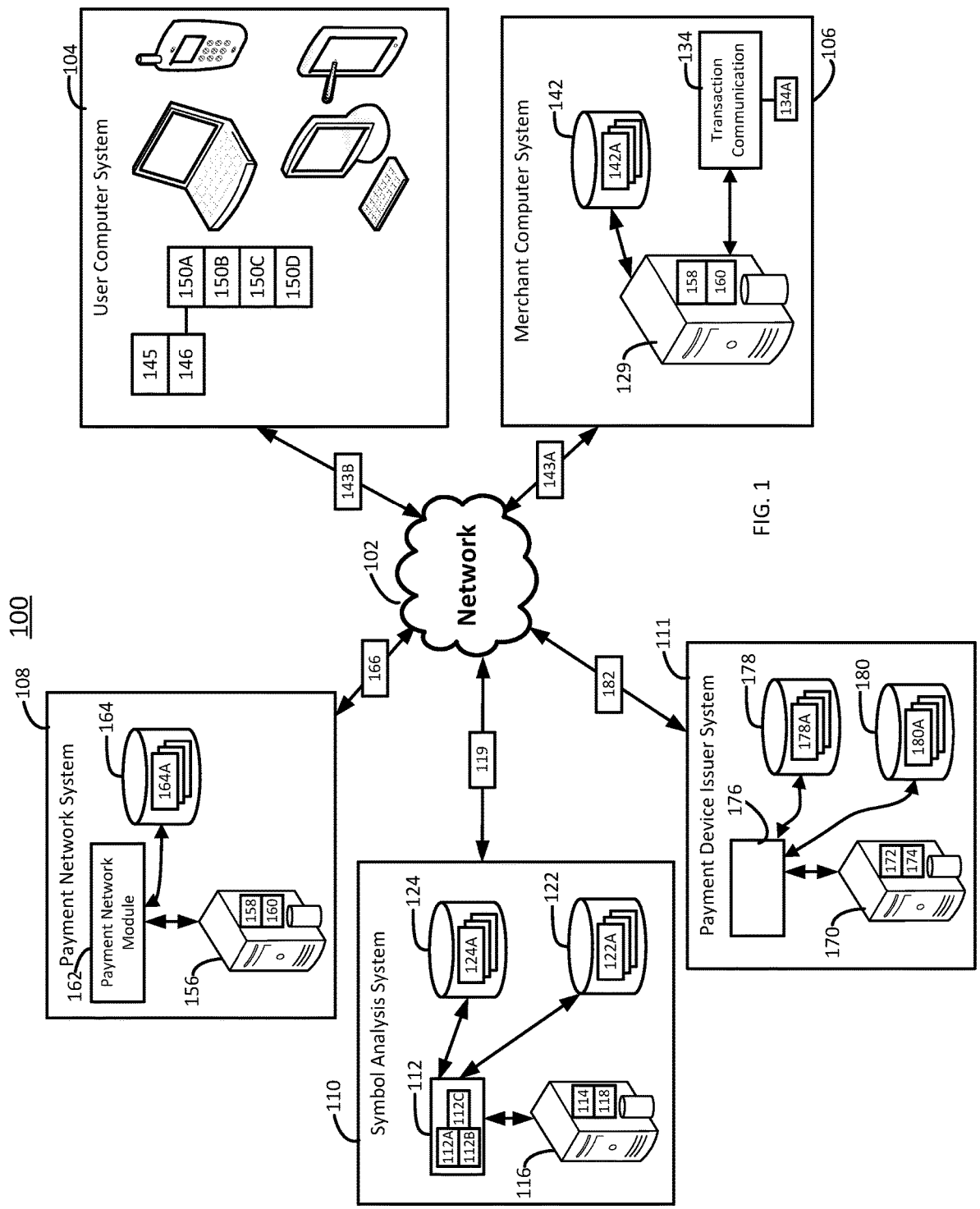
FIG. 1 illustrates a sample symbol payment system.

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

In the past, payments required exchanging currency. Modern times have brought in electronic payments which use cards to represent accounts which may be accessed electronically. Further, payments have become part of applications on computing devices where account numbers may be manually typed in. However, users have become more accustomed to typing less and less. Emoji and abbreviations have become more and more common in communication. However, payments still require the laborious entry of numbers and letters to execute a transaction.

Symbols 310 (FIG. 3) may be used to represent payment accounts. The symbols 310 may be programmed to represent accounts and the data for the accounts may be entered into appropriate fields when the symbol 310 is selected. In some embodiments, the symbol may be selected using a sound or a voice. In other embodiments, the symbols 310 may be selected by touching a symbol on a touch screen. In yet another embodiment, a pointer like a joystick is used to select the symbol 310. Once selected, account data is retrieved and is communicated to the proper field in the data entry screen. The account data is then used to complete the transaction.

Technically, the system and method addresses the technical problem of accurately entering account data on a screen of a limited size. Small keyboards and fat or swift fingers often result in inaccurate data being entered into account fields. The inaccurate data may be flagged as errant or may be seen as fraudulent. Often, the transaction is rejected and the data has to be entered again assuming the underlying account has been locked.

The technical solution greatly reduces the problem of inaccurate typing by replacing typing with simply selecting a symbol. The selection may not even require typing and may be made using a voice command. In other embodiments, the selection may be of a symbol 310 on a display. The selection may use a touch screen, a track ball, a pointer device or the like.

FIG. 1 generally illustrates one embodiment of a payment system 100 for completing transactions such as payments and other funds transfers using symbols 310. The system 100 may include a computer network 102 that links one or more systems and computer components. In some embodiments, the system 100 includes a user computer system 104, a merchant computer system 106, a payment network system 108, a symbol analysis system 110, and a payment device issuer system 111.

The network 102 may be described variously as a communication link, computer network, internet connection, etc. The system 100 may include various software or computer-executable instructions or components stored on tangible memories and specialized hardware components or modules that employ the software and instructions to receive symbols 310 to enable payments by monitoring communications between users and merchants as well as other parties in the payment ecosystem.

The various modules may be implemented as computer-readable storage memories containing computer-readable instructions (i.e., software) for execution by one or more processors of the system 100 within a specialized or unique computing device. The modules may perform the various tasks, methods, modules, etc., as described herein. The system 100 may also include both hardware and software applications, as well as various data communications channels for communicating data between the various specialized and unique hardware and software components.

The symbol analysis system 110 may include one or more instruction modules including a module 112 that, generally, may include instructions to cause a processor 114 of a symbol analysis server 116 to functionally communicate with a plurality of other computer-executable steps or sub-modules, e.g., sub-modules 112A, 112B, 112C, and components of the system 100 via the network 102. These modules 112A, 112B, 112C may include instructions that, upon loading into the server memory 118 and execution by one or more computer processors 114, determine whether a recognized symbol 310 has been received and may be processed by the payment network system 108. For example, sub-modules may include a first machine learning module 112A, a second machine learning module 112B, a data integration module 112C, etc. A first data repository 122 may store symbol data 122A for entities of the system 100. In some embodiments, further data repositories may correspond to different types of symbol data 122A or sub-components of the symbol data 122A (e.g., a transaction region, transaction type, a time of day, a merchant and/or customer type, a payment device type, a transaction clearing delay, transaction amount, cardholder name, cardholder account number, and other payment network account data 164A, etc.). Various other data 124A may be received and/or derived by the symbol analysis system 110 and stored in a second data repository 124 and used by the system 100 as described herein. For example, the second data repository may be used to store electronic wallet transaction details 124A from an electronic wallet system or other method of electronic or computer-based payment.

The merchant computer system 106 may include a computing device such as a merchant server 129 including a processor 130 and memory 132 including components to facilitate transactions with the user computer system 104 via other entities of the system 100. In some embodiments, the memory 132 may include a transaction communication module 134. The transaction communication module 134 may include instructions to send merchant messages 134A to other entities (i.e., 104, 108, 110, 111) of the system 100 to indicate a transaction has been initiated with the user computer system including payment device data and other data as herein described. The merchant computer system 106 may also include a transaction repository 142 and instructions to store payment and other transaction data 142A within the transaction repository 142. In some embodiments, the merchant computer system 106 may send payment data 143A corresponding to a payment device like a credit card or other account access device to the payment network system 108 or other entities of the system 100, or receive payment data 143B from the user computer system 104 in an electronic wallet-based or other computer-based transaction between the user computer system 104 and the merchant computer system 106.

A user computer system 104 may include a processor 145 and memory 146. The user computing system 104 may include a server, a mobile computing device, a smartphone, a tablet computer, a Wi-Fi-enabled device or other personal computing device capable of wireless or wired communication, a thin client, or other known type of computing device. The memory may include various modules including instructions that, when executed by the processor 145 control the functions of the user computer system generally and integrate the user computer system 104 into the system 100 in particular. For example, some modules may include an operating system 150A, a browser module 150B, a communication module 150C, and an electronic wallet module 150D. In some embodiments, the electronic wallet module 150D and its functions described herein may be incorporated as one or more modules of the user computer system 104. In other embodiments, the electronic wallet module 150D and its functions described herein may be incorporated as one or more sub-modules of the payment network system 100.

The payment network system 108 may include a payment server 156 including a processor 158 and memory 160. The memory may include a payment network module 162 including instructions to facilitate payment between parties (e.g., one or more users, merchants, etc.) using the payment system 100. The module 162 may be communicably connected to an account holder data repository 164 including payment network account data 164A. The payment network account data 164A may include any data 182 to facilitate payment and other funds transfers between system entities (i.e., 104, 106, 110, and 111). For example, the payment network account data 164A may include identification data, account history data, payment device data, etc. The module 162 may also include instructions to send payment messages 166 to other entities and components of the system 100 in order to complete transactions between users and/or merchants.

A payment device issuer system 111 may also include a payment device issuer server 170 including a processor 172 and memory 174. The memory may include a payment device issuer module 176 including instructions to facilitate payment to the merchant computer system 106 using the payment system 100. The module 176 may be communicably connected to a clearing data repository 178 including account clearing data 178A. The clearing data 178A may include data to facilitate payment and other funds transfers to/from the merchant. For example, the clearing data 178A may include identification data, account history data, payment device data, etc. The module 176 may also be communicably connected to a cardholder account data repository 180 including cardholder account data 180A. The module 162 may also include instructions to receive payment messages 166 from the payment network system 108 and may include the symbol data 119 in order to complete transactions between users and/or merchants and better manage user and merchant funds account balances to complete transactions.

Figure 2:
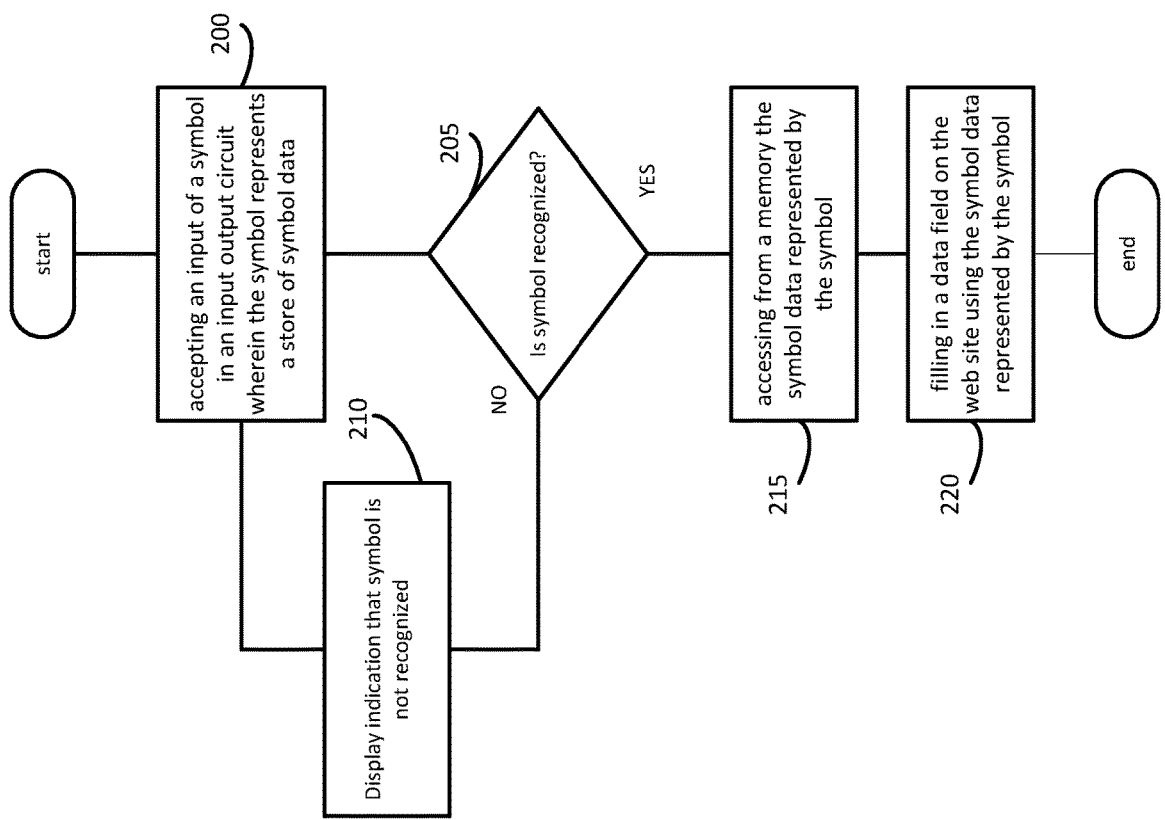
FIG. 2 a method used to physically configure a server to perform the symbol payment method.

Referring now to FIG. 2, a method of enabling a user interface designed to improve payments on a computing device may be disclosed. The method may be executed by the symbol analysis system 110 and the symbol analysis system 110 may have a processor 904, a memory 906 and an input output circuit 924.

At block 200, an input of a symbol 310 may be accepted in an input output circuit 924. The symbol 310 may take on a variety of forms. At a high level, the symbol 310 may be a representation of data. Instead of having to manually type in the data over and over using a tiny keyboard, the symbol 310 may be used to represent the data. As an example, instead of having to repeatedly type in a credit card number, a user may be able to simply select a symbol 310 and the data 122A represented by the symbol 310 may be entered in the appropriate fields. The symbol data 122A may include a credit card number, an expiration date, a billing name, a billing address, a security code, etc.

In some embodiments, the symbol 310 may be displayed on a user interface. It may be in an app function such as a browser function that is viewed as a ribbon or defined area 410 (FIG. 4) on the bottom, side(s) or top of a user interface. As part of the provisioning process, the user may be able to select the look and location of the ribbon 410 of symbols 310. For example, a user may make the ribbon 410 larger or smaller, different in color, on the right side of the display, etc. Further, the ribbon 410 may be modified by the provisioner. For example, an issuer acting as the provisioner may use issuer related colors or an issuer logo to highlight the ribbon 410.

By selecting the symbol, an application may activate and the application may review the pending display to determine how the data from the symbol 310 may be appropriately placed in the input boxes on the user interface. For example, symbol data 122A may include a bill address and the application may review the pending input field for one labeled "address" or something similar.

The application may using machine learning to assist in placing the proper data in the proper fields. For example, if a field label account address is the appropriate place to enter symbol data 122A entitled billing address for a particular web site, the symbol analysis system 110 may store that information and use it in the future when determining how to fill in input fields in the future. The symbols 310 may be part of a browser extension or may be an aspect of an application that may work with the application through appropriate APIs.

When the symbol analysis system 110 recognizes a payment is occurring, symbols 310 may be displayed. The determination that a payment is occurring may occur in several ways. In some embodiments, separate web pages may be loaded and the symbol analysis system 110 may analyze the page, determine a payment is being made and may execute the symbol analysis system 110. In other embodiments, a user may request that the symbol analysis system 110 start.

As will be described with respect to FIG. 3, the system may also have the symbols 310 preloaded on the device and the symbols 310 may be accessed by selecting a shift type key on the device. The symbols 310 may be selected and placed in a text or may be used to fill in a form.

Figure 3:
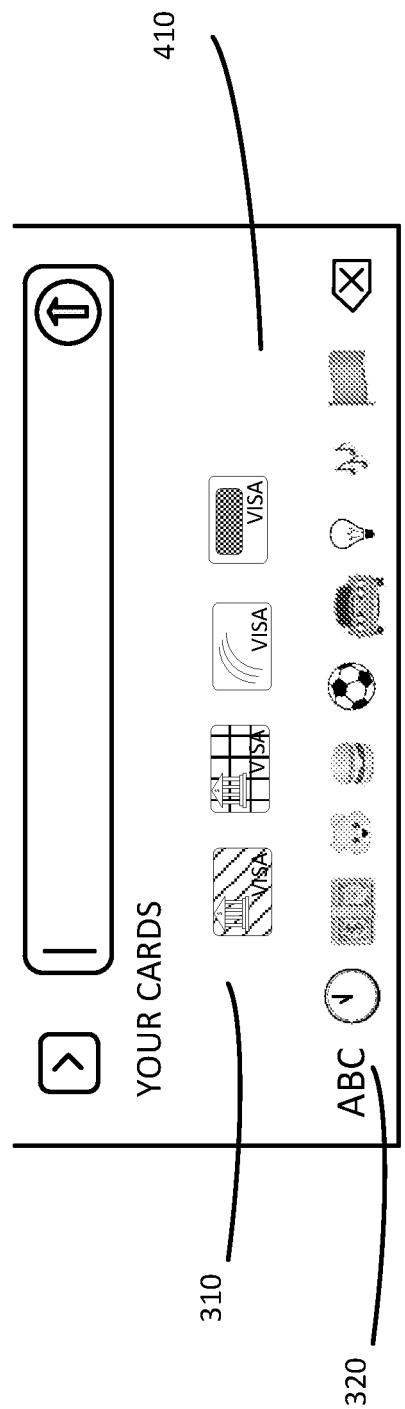
FIG. 3 illustrates a separate input region displaying symbols.
Figure 4:
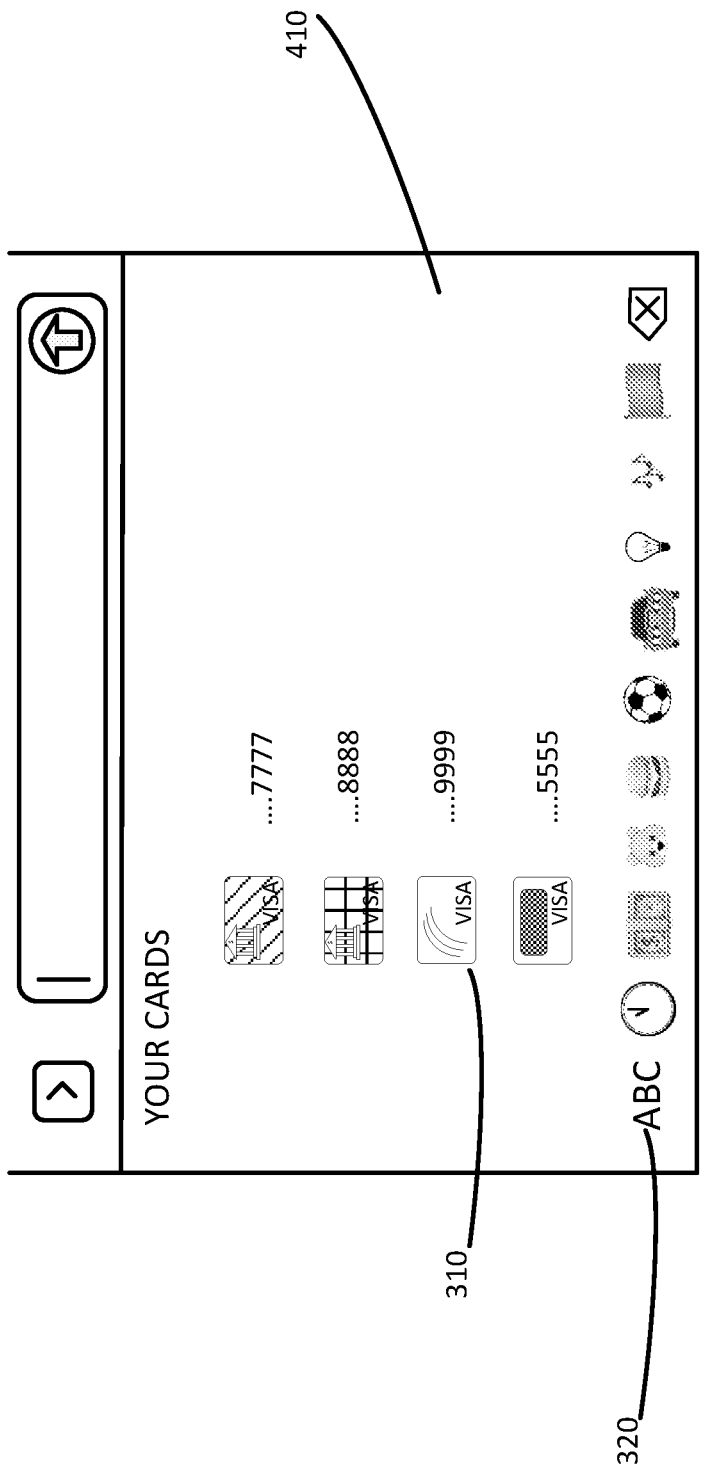
FIG. 4 illustrates a separate input region displaying symbols.

FIG. 3 may be an illustration of one possible illustrations of symbols 310 on a user interface. In an embodiment, a user may select to see one or more symbols 310 by touching a type of shift key on the keyboard to access the saved symbols 310. A variety of different emojis 320, such as an input screen of animal emojis, sports emojis, text, etc. and the payment symbols 310 may be displayed within a ribbon 410. FIG. 4 may illustrate yet another manner of displaying symbols 310 where the symbols 310 are arranged vertically rather than horizontally.

As can be seen, the symbols 310 may be larger than a traditional key on a portable computing device keyboard. As a result, the symbols 310 are easier to select and less input errors may occur. Further, the account issuer may be able to create symbols 310 which are visually appealing which may lead to a user selecting to use that account.

In another aspect, the symbols 310 may be illustrated in such a way to remind a user of the account represented by the symbol 310. For example, a blue symbol 310 may represent a first bank account and a red symbol 310 may represent a second account. The illustrations of the symbols 310 may be preset by the symbol 310 provisioner or may be modified by a user. For example, a user may use a photo or drawing as a symbol such as using a photo of a bank or a credit card to be the illustration of the symbol 310. Similarly, the illustration may be provided by the account issuer and may be card art that is a scaled down version of a credit card, for example.

In some embodiment, a user interface may allow a user to add accounts and to define the look of the symbol 310. The user interface may be on a portable computing device or may be on a traditional computing device which may make it easier to enter all the desired data. In other embodiments, the symbol 310 is created by the account issuer. The user may be able to select the symbol 310 from the account issuer or may select a different symbol 310 from a plurality of symbols 310 or may select to modify the symbol 310 from the account issuer. The illustrations may only be limited by a user's imagination. If a user routinely uses a wearable device like a ring, bracelet or glove to make transactions for a specific account, the symbol may resemble the wearable device.

Figure 5B:
FIG. 5*b* illustrates a text message using a symbol being used to request money.
Figure 5A:
FIG. 5*a* illustrate a text message using a symbol to send money.

Logically, the symbols 310 may be used to send value or request value. In addition, the symbol 310 may be intermixed with other emojis or text to create a payment request or a payment. As illustrated in FIGS. 5a and 5b, the last element in the text line may be the account used to send or receive funds. The symbol 310 may be selected from the symbols 310 displayed in the ribbon 410 on the lower border of the display. Thus a traditional text message may be used to communicate a request to send funds or receive funds and the amount of text used may be minimized as the entire account number does not need to be typed into the system 100.

Figure 6:
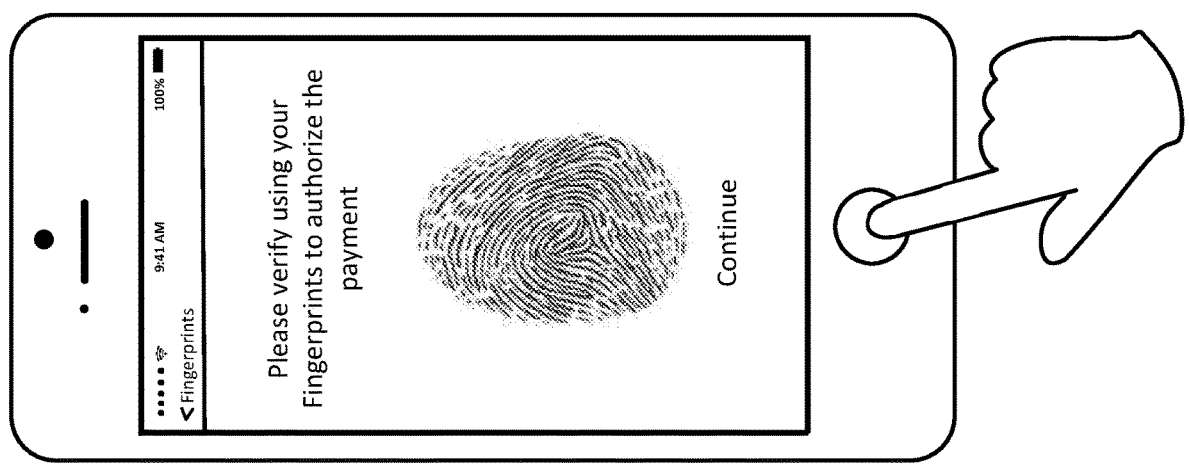
FIG. 6 illustrates a biometric authorization for using an account represented by a symbol to make a transaction.

To ensure security such as when a nefarious person picks up a mobile computing device of another user, verification may be required. As can be imagined, verification may take on a variety of forms. In FIG. 6, a fingerprint may be used as verification. In addition, facial recognition, iris scans, and other biometric checks may be used to verify a request is authorized by the user.

In some embodiments, the symbol 310 may be received through a voice command. For example, a user could dictate a text message "Pay Ralph $5 using the blue card." The symbol analysis system 110 may be physically configured for analyzing the voice signal, determining if the voice signal matches a known signal and if the voice signal matches a known signal, selecting the known signal. For example, when an account is added to the symbol analysis system 110, a user may be able to given it a spoken name like "blue card." Thus, the symbol analysis system 110 may be able to compare the received voice command to store voice commands to determine which account is being referenced. In addition, machine learning may be used to refine the use of voice to select symbols 310. For example, if the user say "use azul card" and edits the payment to use the blue card on a first transaction, in the future, the system may know to use the blue card when the user requests to use the azul card.

As mentioned previously, a set up methodology may also exist. In one embodiment, the details of a payment device or account such as a credit card may be received. The details of the account may be communicated through the computer network 100 to verify the information is accurate. A verification may then be created to verify the user truly has access to the entered account. In one embodiment, a biometric verification may be used while in other embodiments, a traditional name and password may be used. Assuming the verification is successful, the user may be able to personalize the symbols 310 representing the accounts.

The details may be stored locally in a secure manner. In another embodiment, the details may be stored remotely and may be received in a variety of ways. In some embodiments, encryption is used to safely communicate the data. In other embodiments, a token server may be used and tokens may be exchanged where the tokens are not the actual account numbers but represent the account numbers and are translated by a secure token server.

The symbols 310 may be provisioned in a variety of ways. In one embodiment, the symbols 310 may be provisioned by the account issuer. For example, if the account is a credit account like a credit card, the bank or credit union that issued the credit card may provision the symbols 310. In this way, the symbols 310 may contain identification of the account issuer. The provisioning may occur through the download of an app such as from an app store. In other embodiments, the user may follow a secure link to download the necessary computer instructions to provision the symbols 310.

In some embodiments, the symbols 310 may display additional information to the user. As an example, the symbols 310 available may display an available balance or a current balance due as received or pulled from a payment device issuer system 111, for example. In other embodiments, the balance levels may be indicated by a color such as a low balance due being indicated in green and a high balance due being indicated in red. In yet another aspect, the symbol may change back to a first image or color when communicated to the payment network system 108 such that the receiver may not see the balance or color but only the relevant payment data necessary to complete a transaction.

In other embodiments, a credit card association may provide the app or computer instructions to provision the symbols 310 in a similar manner. In another embodiment, the symbols may reference a virtual wallet executing on the computing device and the symbols may represent accounts present in the virtual wallet.

In yet another embodiment, a third party may create the computer instructions to enable the symbol 310 provisioning. By using a third party, the provisioning may allow for even more customization that from an account issuer. For example, even more customization of the symbols 310 may be available as account issuers may desire to control the look of the symbols 310. As a result, the third party may be able to attract additional users.

In yet a further embodiment, the computer instructions to enable the symbol 310 provisioning may be part of the computing device operating system. For example, a mobile smart phone may use the Android operating system or the Apple® mobile operating system and as part of the operating system, symbol 310 provisioning may be part of the operating system.

In an additional aspect, the symbol 310 may be configured to include sounds or voices. For example, when using the symbols 310 to request payment to the account represented by the symbol 310, a voice may be included saying "The rent is due!" or "this request relates to Acme Corp" which again, may be easier than typing a message using a tiny keyboard on a portable computing device, for example The sound may be included as part of the message communicated to the network 102.

Referring again to FIG. 2, at block 205 in response to the symbol 310 not being recognized, a not recognized output may be communicated to the user. The user may be able to accept the issue or may be able to connect the request to an existing account. In other embodiments, the symbol analysis system 110 may recognize that an account has expired and may prod the user to update the account before trying to use the expired account.

At block 210, the symbol 310 may be recognized. In some embodiment, the simple selection of a symbol 310 may be straightforward. In other embodiments, a user may select between two symbols 310 and the system 100 may be unsure which symbol 310 is being selected. Similarly, if the symbol 310 is a voice input, the voice input may not be understood or may be garbled due to background noise and the symbol 310 may not be recognized. In application, the voice command may be converted in a digital signal and that digital signal may be compared to stored digital signals to determine which symbol 310 is being selected.

Again, machine learning may be used to compare the digital signal to other likely digital signals and suggestions may be made to the user asking for clarification such as "Did you mean the blue card or the bluebird card?" Response to the queries may be used by the machine learning aspects to improve future performance.

Figure 7A:
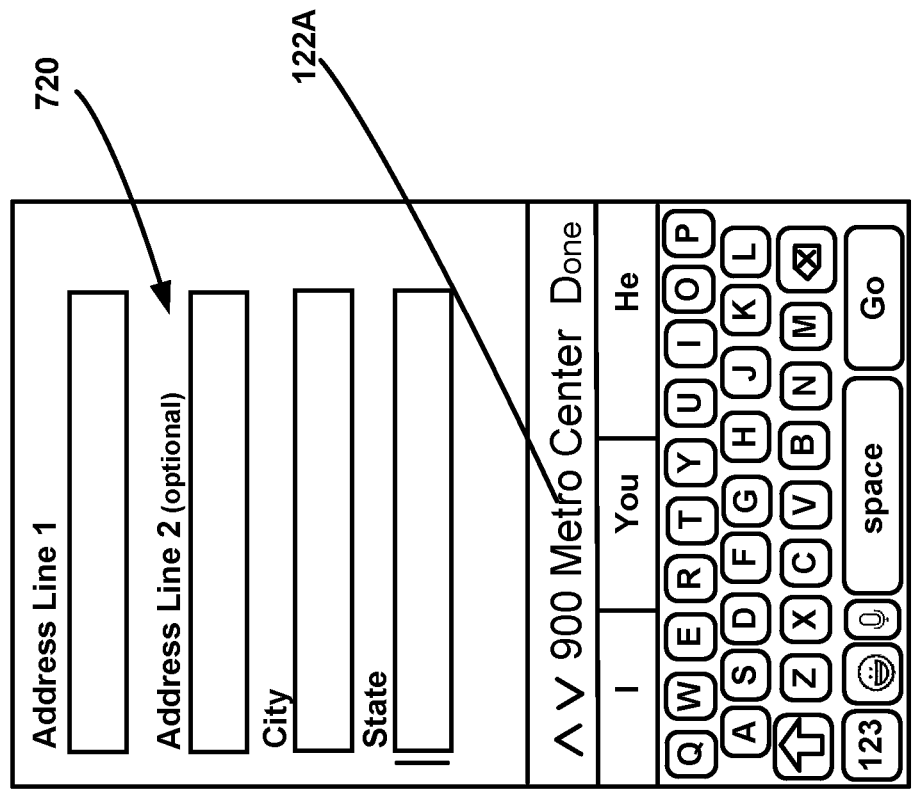
FIG. 7*a* illustrates a symbol being selected.
Figure 7B:
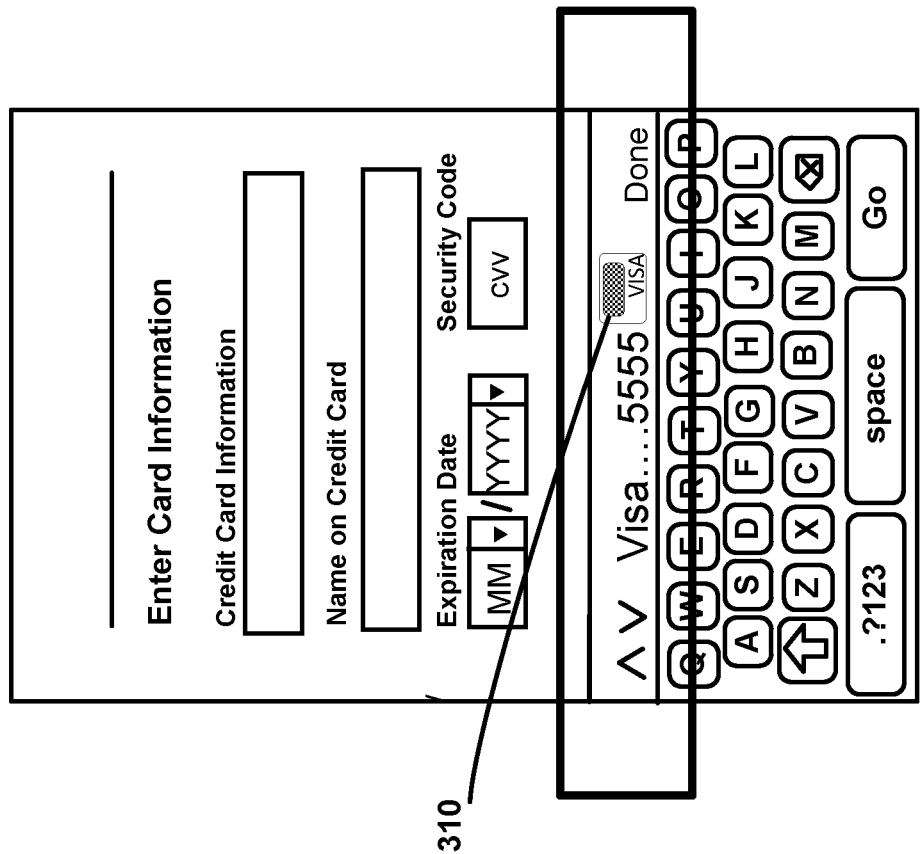
FIG. 7*b* illustrates symbol data for a selected symbol being displayed.
Figure 8:
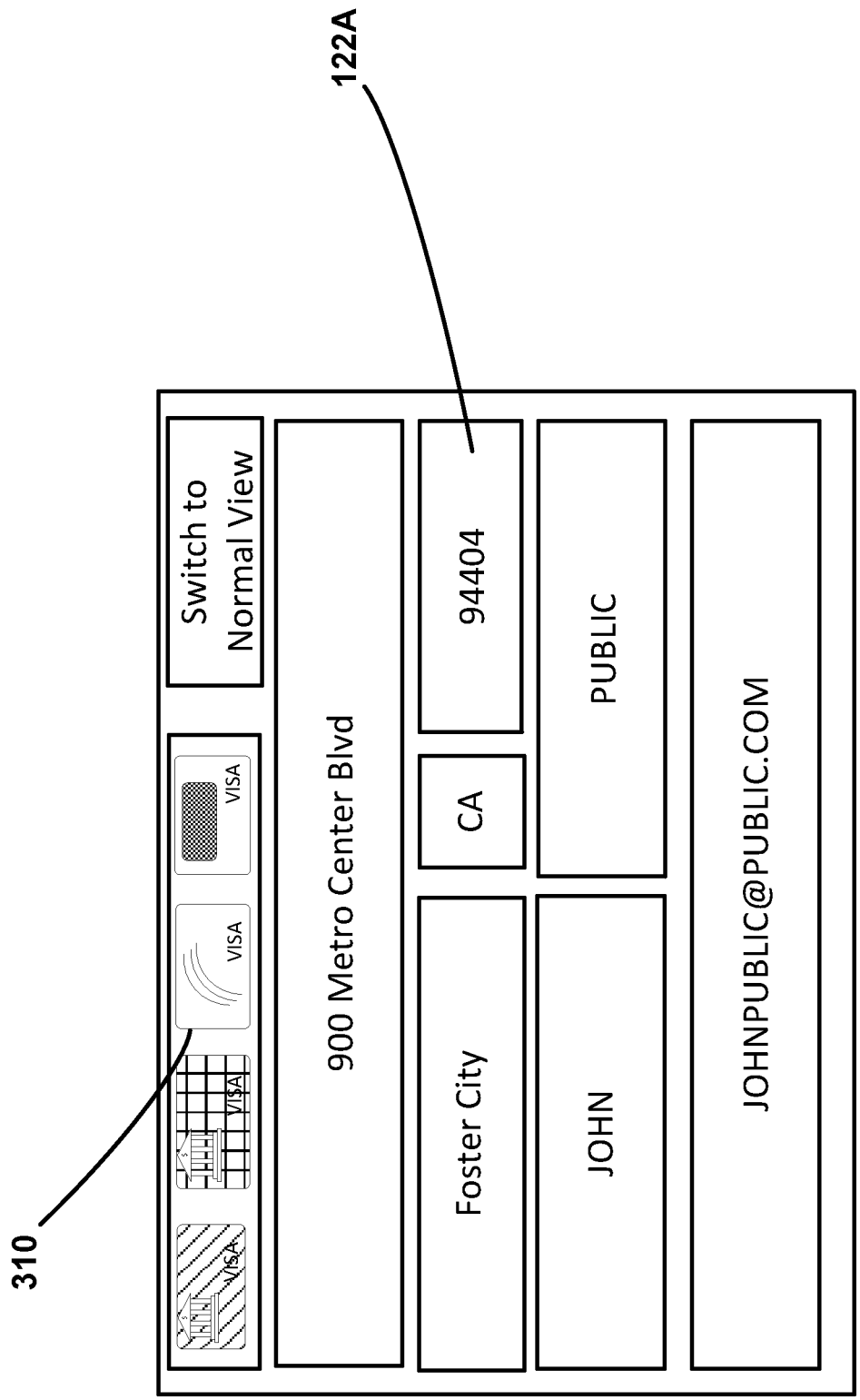
FIG. 8 is an illustration of symbol data related to a selected symbol being displayed to a user

At block 215, symbol data 122A represented by the symbol 310 may accessed from a memory. As illustrated in FIG. 7a, the selection of the blue symbol 310 may be associated with the address "900 Metro Center" (FIG. 7b) and the input field may be filled in with the appropriate symbol data 122A.

Logically, the symbol data 122A may be stored locally in a secure manner or may be stored remotely. If the symbol data 122A is stored remotely, a request may be formatted according to a protocol and may be communicated to a remote server according to an application programming interface (API) and the remote server may respond with the symbol data 122A if the request is determined to be legitimate.

Figure 9:
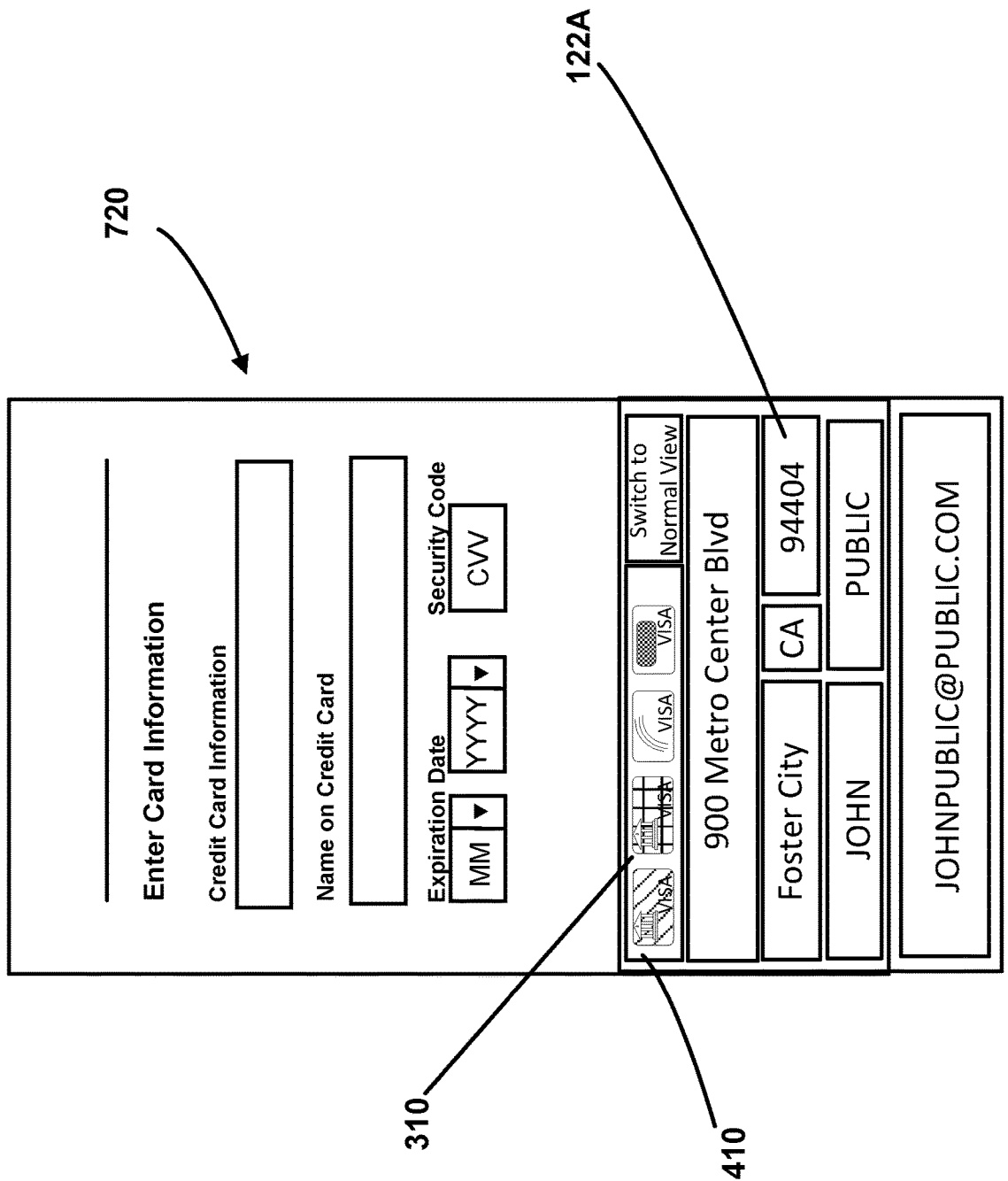
FIG. 9 is an illustration of symbol data related to a selected symbol being displayed to a user.
Figure 10:
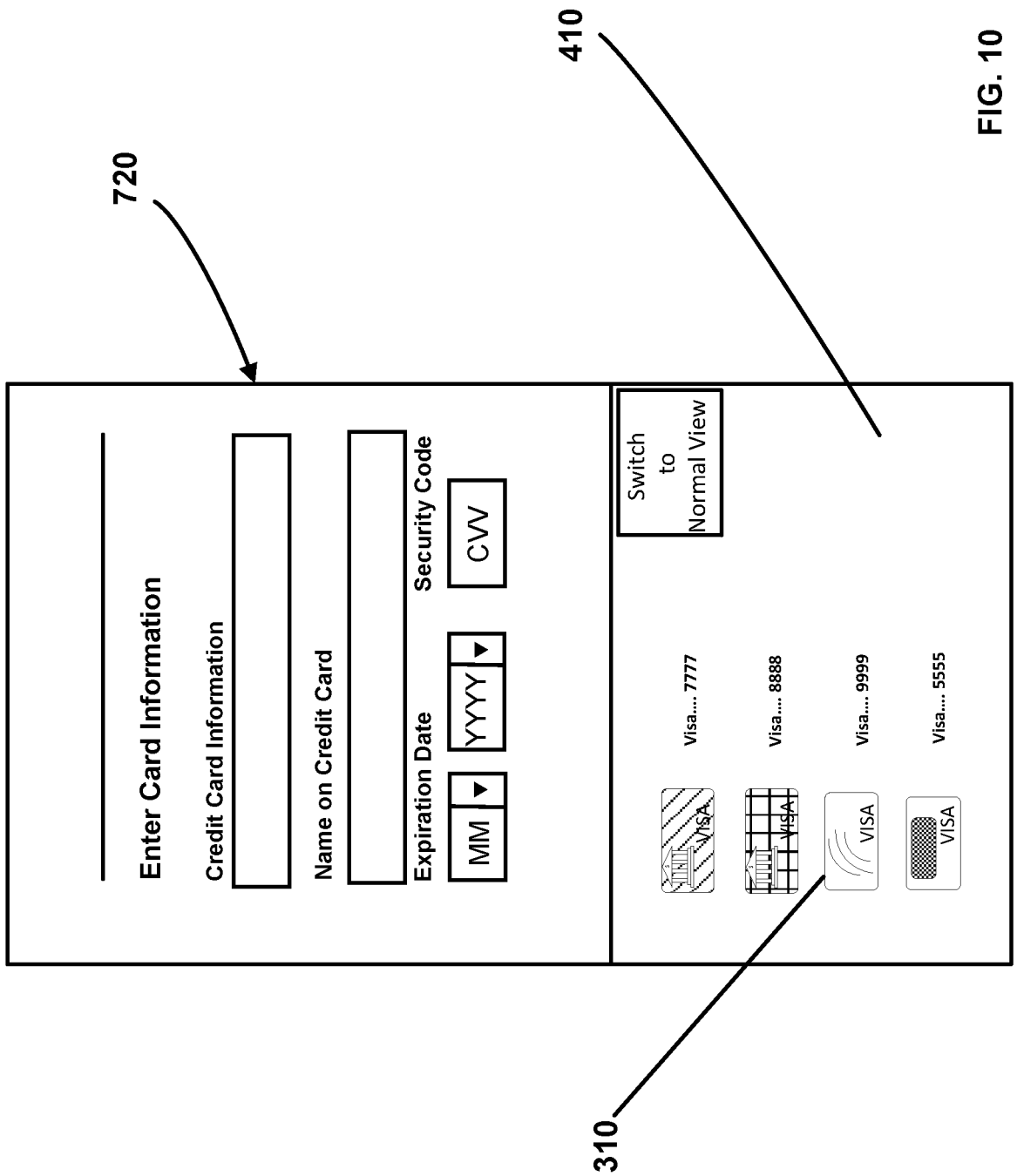
FIG. 10 is a user interface that demonstrates how symbol data may be used to fill in a web site or application form.
Figure 11:
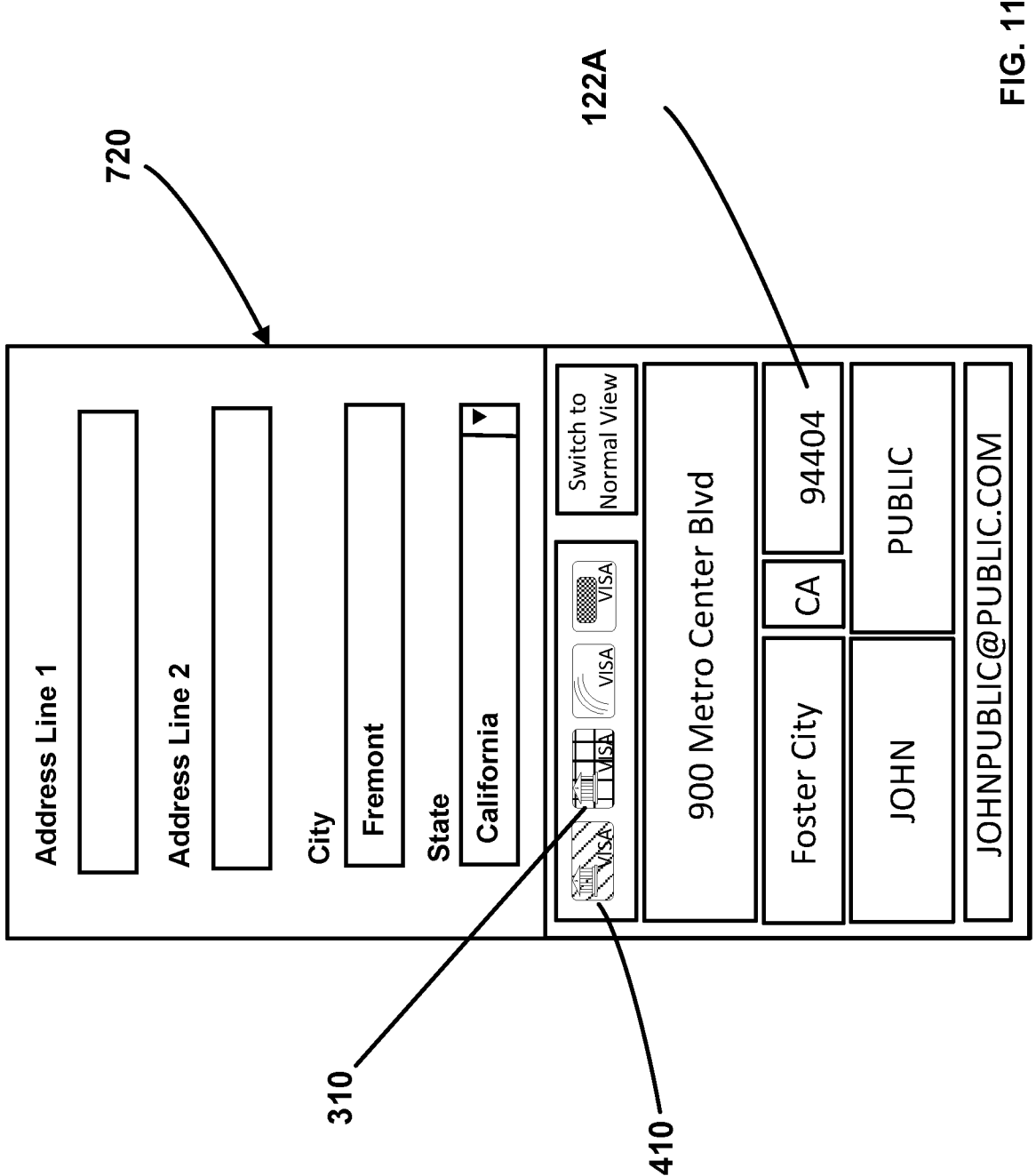
FIG. 11 is an illustration of a user interface where symbol data is displayed to the user.

At block 220, a data field 720 on the electronic form such as a web site or application may be filled using the symbol data 122A represented by the symbol 310. In some embodiments, the symbol data 122A may be displayed to the user such as in FIGS. 8, 9, 10 and 11. In this embodiment, the user may be able to approve the symbol data 122A or request that another symbol 310 be used. In other embodiments, such as in FIG. 9, a user may request to see the symbol data 122A to ensure the desired symbol 310 and account are being used. In FIG. 10, a user may see additional symbol data 122A to ensure the desired account is being used. In FIG. 11, an embodiment is displayed where a user has an opportunity to review the symbol data 122A and may edit the symbol data 122A as needed. Logically, the machine learning module may note the changes for future use.

In some embodiments, the proper entry of the symbol data 122A into the form field 720 may be simple such as placing an account number in an account number field. In other embodiments, the determination may be more complicated. In the trickier situations, the data fields 720 types may be determined, the data types represented by the symbol 310 may be determined, the appropriate symbol data 122A to appropriate data fields 720 maybe determine and the appropriate data 122A may be entered in the appropriate fields 720.

Logically, the system of using symbols 310 may be used in other electronic formats such as email, SMS, iMessages, etc. The symbol analysis system 110 may have to review the messages that are communicated though the network 100 and translate the symbols 310 into actions that are then communicated through the network 100 to the relevant parties. For example, a user may communicate a request for payment using a text message that includes a symbol 310. The payer may respond with a payment text message (which also may include a payer's symbol 310) and the funds may be transferred to the user using the account information and routing information that may be represented by the symbol 310 of the user and logically, the funds may be removed from the payer's account using the routing and account information represented by the payer's symbol 310. A similar process may occur without regard to the form of electronic communication so long as the symbol analysis system 110 has access to the messages and had the necessary tools to understand the messages. For example, if a message is encrypted, the symbol analysis server 110 may need one or more keys to decrypt the message.

Figure 12:
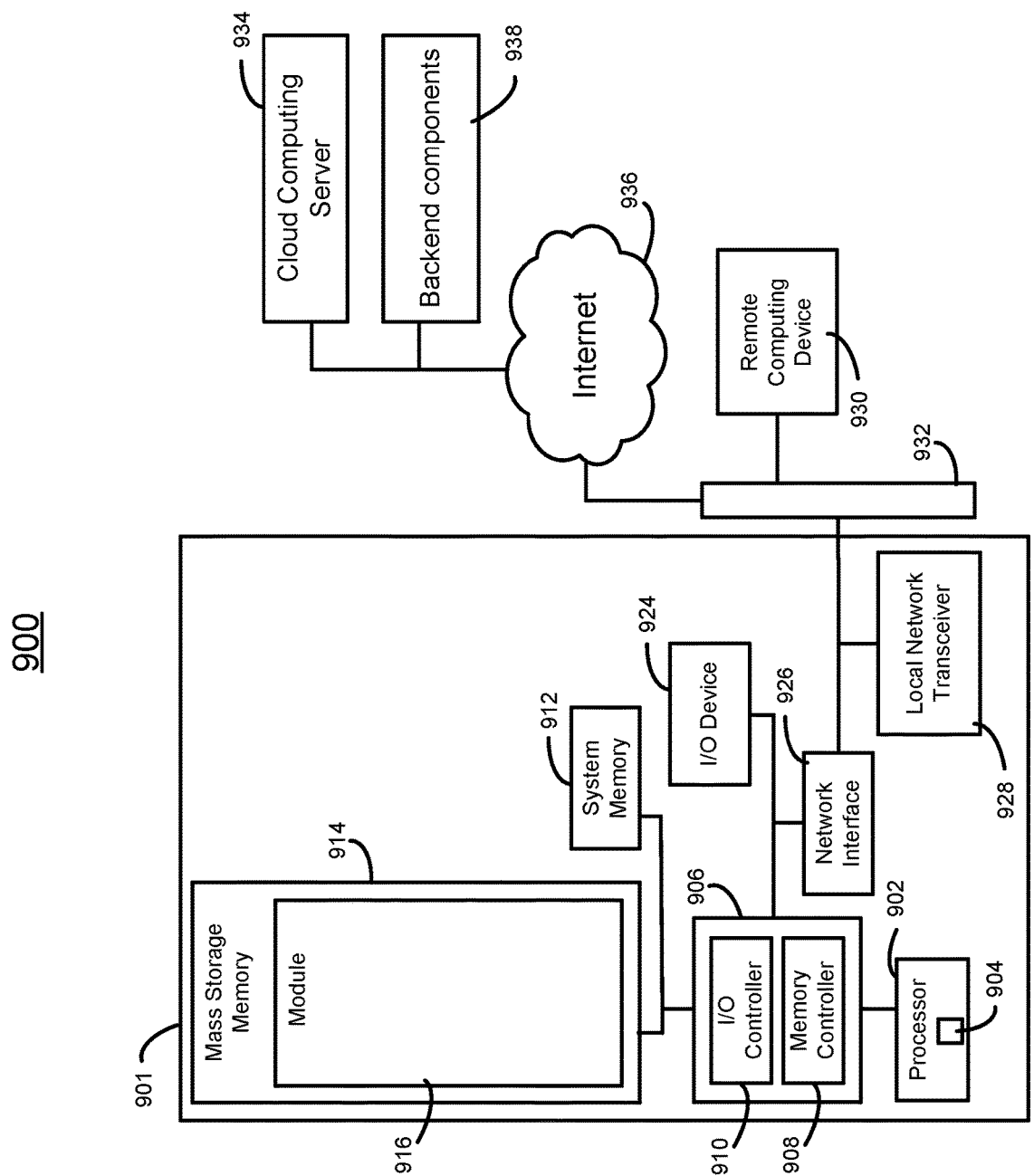
FIG. 12 may be an illustration of a sample server that may be adapted to some of the functions in the system.

FIG. 12 may be a high-level block diagram of an example computing environment 900 for the system 100 and methods (e.g., method 200) as described herein. The computing device 900 may include a server (e.g., the payment server 156, merchant server 129, payment server 156, symbol analysis server 116, mobile computing device (e.g., user computing system 104), a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 12, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 12, the computing device 901 may be a multi-processor device and, thus, may include one or more additional processors that are identical or similar to the processor 902 and that are communicatively coupled to the interconnection bus.

The processor 902 of FIG. 12 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method, comprising:
displaying, by a touch screen of a user computing device, a user interface for executing a payment transaction, wherein the user interface comprises a field for receiving payment account data and a keyboard for entering the payment account data into the field, the keyboard comprising a shift key;
determining, by an application executed by the user computing device, a payment is occurring based on the touch screen displaying the user interface for executing the payment transaction;
updating, by the touch screen based on receiving a user selection of the shift key, the user interface to include a ribbon comprising a plurality of selectable emojis, wherein the ribbon displayed in a defined area of the user interface;
retrieving, by the application executed by the user computing device, an account balance of a payment account;
automatically displaying, by the application executed by the user computing device based on determining that the payment is occurring, a symbol representing payment account data associated with the payment account within the ribbon comprising the plurality of selectable emojis of the user interface, wherein the symbol is an emoji comprising a first characteristic to indicate a high account balance when the account balance is above a predetermined threshold, and wherein the symbol is an emoji comprising a second characteristic to indicate a low account balance when the account balance is below the predetermined threshold;
receiving, by the touch screen, a user selection of the symbol;
formatting, by the application executed by the user computing device, the payment account data based on the field;
auto-populating, by the application executed by the user computing device, the field with the payment account data based on receiving the user selection of the symbol;
transmitting, by the user computing device, the payment account data to a payment network to execute the payment transaction; and
modifying, by the application executed by the user computing device, the symbol based on transmitting the payment account data, wherein modifying the symbol comprises removing the first characteristic that indicates the high account balance or removing the second characteristic that indicates the low account balance.

2. The method of claim 1, wherein the field for entering data comprises multiple fields, and wherein formatting, by the application executed by the user computing device, the payment account data according to the field comprises identifying data from the payment account data corresponding to each of the multiple fields.

3. The method of claim 2, wherein automatically displaying, by the application executed by the user computing device based on determining that the payment is occurring, the symbol within the ribbon comprising the plurality of selectable emojis of the user interface comprises automatically displaying multiple symbols within the ribbon comprising the plurality of selectable emojis of the user interface, and wherein each of the multiple symbols represents different payment account data corresponding to different payment accounts.

4. The method of claim 1, further comprising:
requesting, by the application executed by the user computing device, user verification for authorizing the payment transaction, wherein requesting the user verification for authorizing the payment transaction comprises requesting a biometric verification.

5. The method of claim 1, further comprising, receiving, by the user computing device, a message from an issuer computing device provisioning the symbol.

6. The method of claim 1, wherein the first characteristic comprises a first color, and wherein the second characteristic comprises a second color different from the first color.

7. The method of claim 1, the first characteristic comprises a first image, and wherein the second characteristic comprises a second image.

8. A computing device, comprising:
a touch screen;
an input/output (I/O) circuit;
a processor; and
a memory, wherein the memory comprises instructions executable by the processor to:
cause the touch screen to display a user interface for executing a payment transaction, wherein the user interface comprises a field for receiving payment account data and a keyboard for entering the payment account data into the field, the keyboard comprising a shift key;
determine a payment is occurring based on the touch screen displaying the user interface for executing the payment transaction
retrieve an account balance of a payment account;
update the user interface to include a ribbon comprising a plurality of selectable emojis based on receiving a user selection of the shift key via the touch screen, wherein the ribbon displayed in a defined area of the user interface;
automatically cause a symbol representing payment account data associated with the payment account to be displayed within the ribbon comprising the plurality of selectable emojis of the user interface, wherein the symbol is an emoji comprising a first characteristic to indicate a high account balance when the account balance is above a predetermined threshold, and wherein the symbol is an emoji comprising a second characteristic to indicate a low account balance when the account balance is below the predetermined threshold
receive a user selection of the symbol via the touch screen;
format the payment account data based on the field;
auto-populate the field with the payment account data based on receiving the user selection of the symbol;
cause the payment account data to be transmitted to a payment network to execute the payment transaction; and
modify the symbol based on transmitting the payment account data, wherein modifying the symbol comprises removing the first characteristic that indicates the high account balance or removing the second characteristic that indicates the low account balance.

9. The device claim 8, wherein the user selection of the symbol is received via the I/O circuit based on the user interacting with the touch screen to select the symbol.

10. The device of claim 9, wherein the field for entering data comprises multiple fields, wherein the instructions executable by the processor to format the payment account data according to the field comprise instructions to identify data from the payment account data corresponding to each of the multiple fields, wherein the instructions executable by the processor to automatically cause the symbol to be displayed within the ribbon comprising the plurality of selectable emojis of the user interface comprise instructions to add multiple symbols within the ribbon comprising the plurality of selectable emojis of the user interface, and wherein each of the multiple symbols represents different payment account data corresponding to different payment accounts.

11. The device of claim 9, wherein the memory further comprises instructions executable by the processor to request user verification for authorizing the payment transaction.

12. The device of claim 11, wherein the instructions to request user verification for authorizing the payment transaction comprise instructions to request a biometric verification.

13. The device of claim 9, wherein the memory further comprises instructions executable by the processor to receive a message from an issuer computing device provisioning the symbol.

* * * * *